(12) United States Patent
Sudoh

(10) Patent No.: US 8,553,335 B2
(45) Date of Patent: Oct. 8, 2013

(54) OPTICAL IMAGING SYSTEM, CAMERA DEVICE, AND HAND-HELD DATA TERMINAL DEVICE

(75) Inventor: Yoshifumi Sudoh, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 129 days.

(21) Appl. No.: 13/297,435

(22) Filed: Nov. 16, 2011

(65) Prior Publication Data

US 2012/0127586 A1    May 24, 2012

(30) Foreign Application Priority Data

Nov. 19, 2010   (JP) .................................. 2010-259353

(51) Int. Cl.
*G02B 15/14*   (2006.01)
*H04N 5/225*   (2006.01)

(52) U.S. Cl.
USPC ............................. 359/687; 359/686; 348/340

(58) Field of Classification Search
USPC .......................... 348/335, 340; 359/686, 687
See application file for complete search history.

(56) References Cited

U.S. PATENT DOCUMENTS

| | | | |
|---|---|---|---|
| 7,253,964 B2 | 8/2007 | Muratani | |
| 7,369,325 B2 | 5/2008 | Sato | |
| 7,372,636 B2 | 5/2008 | Sudoh | |
| 7,532,411 B2 | 5/2009 | Sato | |
| 7,535,653 B2 | 5/2009 | Sudoh | |
| 7,535,654 B2 | 5/2009 | Ohashi | |
| 7,623,298 B2 | 11/2009 | Sudoh | |
| 7,636,201 B2 | 12/2009 | Sudoh et al. | |
| 7,719,773 B2 | 5/2010 | Atsuumi et al. | |
| 7,864,443 B2 | 1/2011 | Sudoh et al. | |
| 7,869,143 B2 | 1/2011 | Sudoh | |
| 8,149,517 B2 * | 4/2012 | Ohashi | 359/687 |
| 8,179,610 B2 * | 5/2012 | Takano et al. | 359/687 |
| 8,405,917 B2 * | 3/2013 | Sudoh | 359/687 |
| 2008/0278779 A1 | 11/2008 | Nishina et al. | |
| 2010/0027136 A1 | 2/2010 | Ohashi et al. | |
| 2010/0296180 A1 | 11/2010 | Sudoh et al. | |
| 2011/0043927 A1 | 2/2011 | Sudoh | |
| 2011/0051260 A1 | 3/2011 | Nakayama et al. | |
| 2011/0069402 A1 | 3/2011 | Sudoh | |
| 2011/0222169 A1 | 9/2011 | Sudoh | |
| 2011/0228408 A1 | 9/2011 | Sudoh | |

FOREIGN PATENT DOCUMENTS

| | | |
|---|---|---|
| JP | 2004-258240 | 9/2004 |
| JP | 2006-113555 | 4/2006 |
| JP | 2007-122019 | 5/2007 |
| JP | 2008-26837 | 2/2008 |
| JP | 2009-93118 | 4/2009 |

* cited by examiner

*Primary Examiner* — David N Spector
(74) *Attorney, Agent, or Firm* — Oblon, Spivak, McClelland, Maier & Neustadt, L.L.P.

(57) ABSTRACT

A zoom lens includes a first lens group having a positive refractive power, and a second lens group having a negative refractive power, an aperture stop, a third lens group having a positive refractive power, and a fourth lens group having a positive refractive power arranged in order from an object side, the third lens group having a first positive lens, a second positive lens, and a negative lens, and a third positive lens in order from the object side. When zooming from short to long focal end, the zoom lens is moved so that the interval between the first and second lens groups increases, that between the second and third lens groups decreases, that between the third and fourth lens groups increases, and the first and third lens groups are positioned closer to the object at the long focal end than the short focal end.

12 Claims, 12 Drawing Sheets

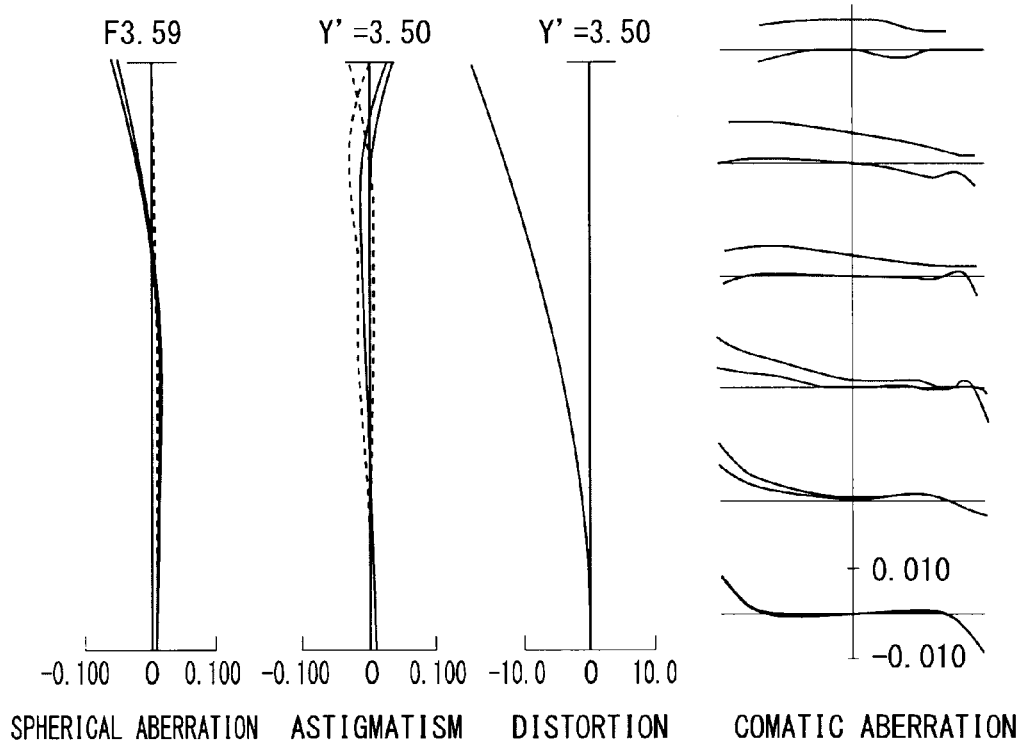
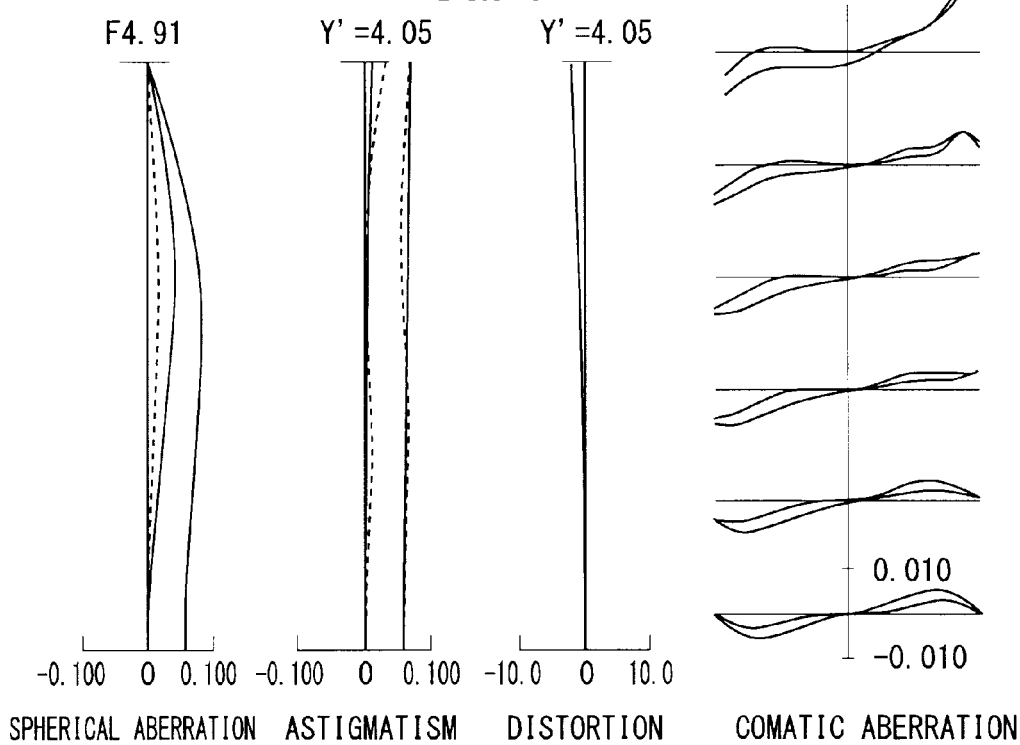

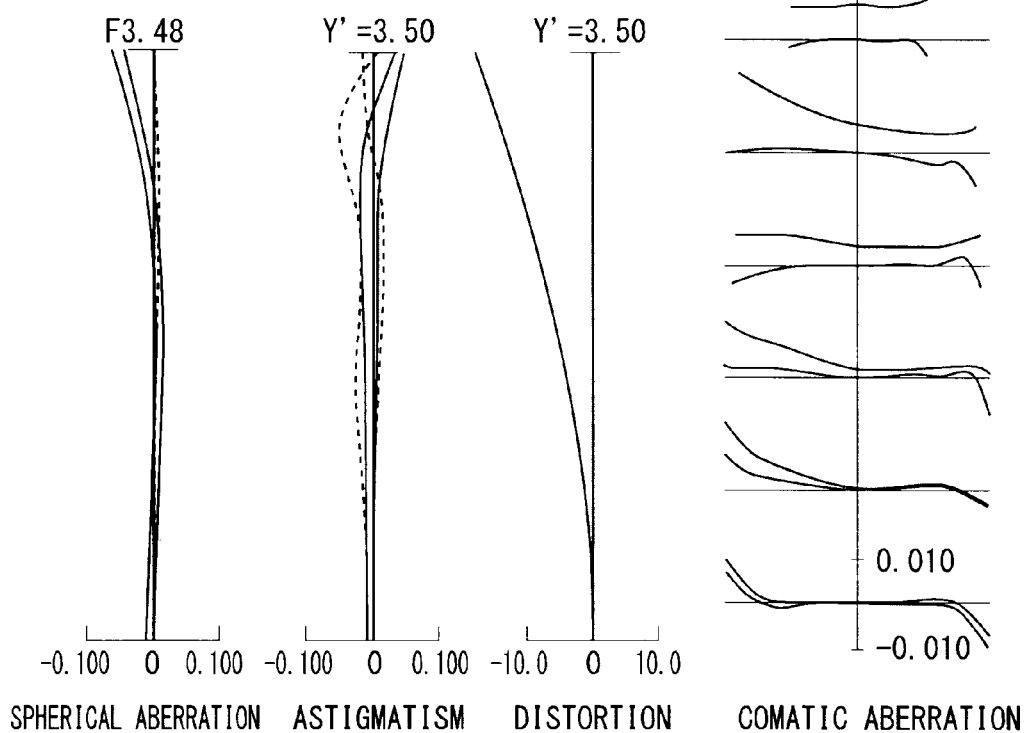
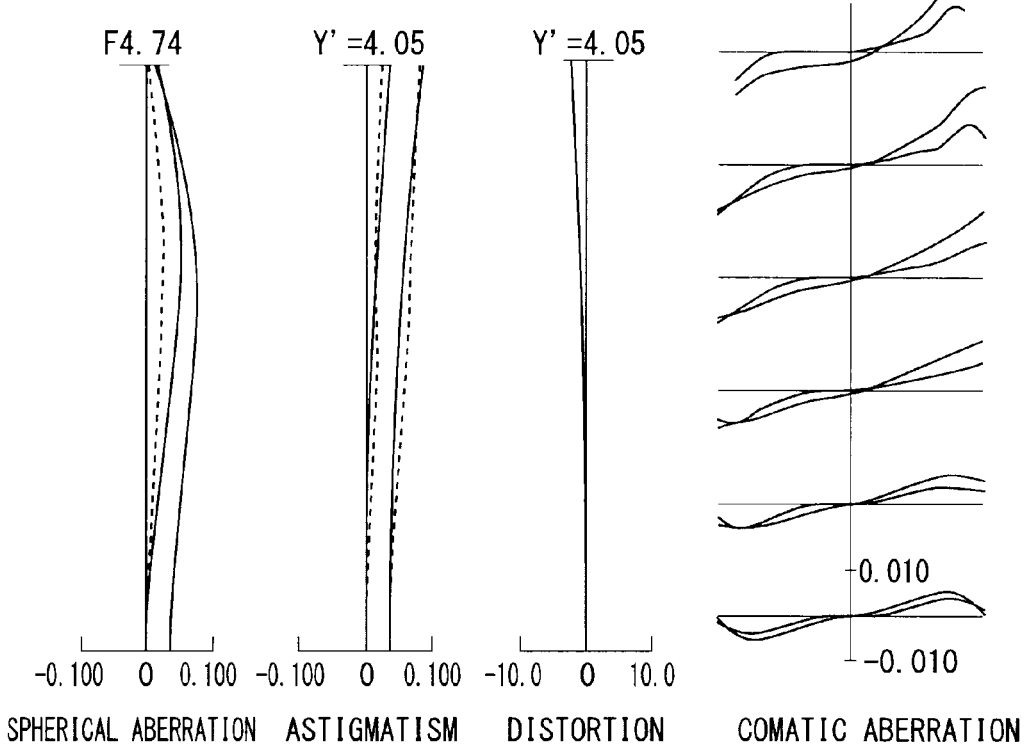

OPTICAL IMAGING SYSTEM, CAMERA DEVICE, AND HAND-HELD DATA TERMINAL DEVICE

CROSS REFERENCE TO RELATED APPLICATION

The present application is based on and claims priority from Japanese Patent Application No. 2010-259353, filed on Nov. 19, 2010, the disclosure of which is hereby incorporated by reference in its entirety.

BACKGROUND OF THE INVENTION

1. Field of the Invention

The present invention relates to a zoom lens applicable as an optical system to a digital camera, a camcorder, and a silver salt film camera, and a camera device and a hand-held data terminal device incorporating such a zoom lens.

2. Description of the Related Art

Along with widespread of a digital camera, users' demands for the digital camera are diversified. Particularly, users have desired development of a high image quality, compact-size camera. Accordingly, development of a high-performance, compact-size zoom lens is also requested.

To downsize the zoom lens, it is necessary to shorten the total lens length of a zoom lens in use from the lens surface closest to an object to an imaging plane and reduce the thickness of each lens group to reduce the total lens length in non-use. To improve the performance of the zoom lens, it is necessary to exert resolution in the entire zoom range to be able to deal with an image sensor with 10 to 15 million pixels. Further, many users desire for a photographic lens with a wider angle of view so that a zoom lens with a half angle of view of 38 degrees or more at short focal end is desirable. The half angle of view of 38 degrees is equivalent to focal length of 28 mm in a 35 mm silver salt film camera (Leica type).

With regard to zoom ratio, a zoom lens with 7.1:1 equivalent to focal length of about 28 to 200 mm of a 35 mm silver film camera can deal with almost all general photographic operation.

Japanese Patent Application Publication No. 2009-93118 (Reference 1), 2007-122019 (Reference 2), 2006-113555 (Reference 3), 2004-258240 (Reference 4), for example, disclose high-performance zoom lenses for a digital camera which comprise first to fourth lens groups from an object side having positive, negative, positive, and positive refractive powers, respectively. These zoom lenses are configured that in zooming from short focal end to long focal end, an interval between the first and second lens groups increases, an interval between the second and third lens groups decreases, and an interval between the third and fourth lens groups varies. The third lens group is comprised of four lenses, a positive lens, a positive lens, a negative lens, and a positive lens arranged in order from an object side.

The zoom ratio of the zoom lens disclosed in Reference 1 is 6.8:1 and does not reach 7:1 or more currently desirable.

The zoom lenses disclosed in References 2 and 3 achieve high zoom ratio but not wide angle of view. Also, the total lens lengths thereof at the long focal end are large so that they are not sufficiently compact in size.

The zoom lens disclosed in Reference 4 has a room for improvement in terms of zoom ratio, angle of view, and downsizing.

SUMMARY OF THE INVENTION

The present invention aims to provide a zoom lens in a compact size including about 11 lenses which achieves wide half angle of view of 38 degrees or more, high zoom ratio of 8:1 or more, and resolution equivalent to an image sensor with 10 to 15 million pixels.

According to one aspect of the present invention, a zoom lens includes a first lens group having a positive refractive power, and a second lens group having a negative refractive power, a third lens group having a positive refractive power, and a fourth lens group having a positive refractive power arranged in order from an object side, the third lens group comprised of a first positive lens, a second positive lens, and a negative lens, and a third positive lens in order from the object side; and an aperture stop disposed between the second lens group and the third lens group, wherein when zooming from a short focal end to a long focal end, the zoom lens is moved so that an interval between the first and second lens groups increases, an interval between the second and third lens groups decreases, an interval between the third and fourth lens groups increases, and the first and third lens groups are positioned to be closer to the object side at the long focal end than the short focal end; and at least two of the first to third positive lenses are made from a material having a partial dispersion ratio defined by $P_{g,F}=(n_g-n_F)/(n_F-n_C)$ which satisfies the following three conditions:

$$1.54 < n_d < 1.7$$

$$62 < v_d < 80$$

$$0.008 < P_{g,F} - (-0.001802 \ast v_d + 0.6483) < 0.050$$

where $n_d$ is a refractive index relative to a d-line, $v_d$ is Abbe number and $n_g$, $n_F$, $n_C$ are refractive indexes relative to a g-line, a F-line, a C-line, respectively.

BRIEF DESCRIPTION OF THE DRAWINGS

Features, embodiments, and advantages of the present invention will become apparent from the following detailed description with reference to the accompanying drawings:

FIG. 5 shows the aberration curves of the zoom lens at short focal end according to the first embodiment;

FIG. 6 shows the aberration curves of the zoom lens at an intermediate focal length according to the first embodiment;

FIG. 11 shows the aberration curves of the zoom lens at short focal end according to the third embodiment;

FIG. 12 shows the aberration curves of the zoom lens at an intermediate focal length according to the third embodiment;

DETAILED DESCRIPTION OF THE PREFERRED EMBODIMENTS

Figure 1:
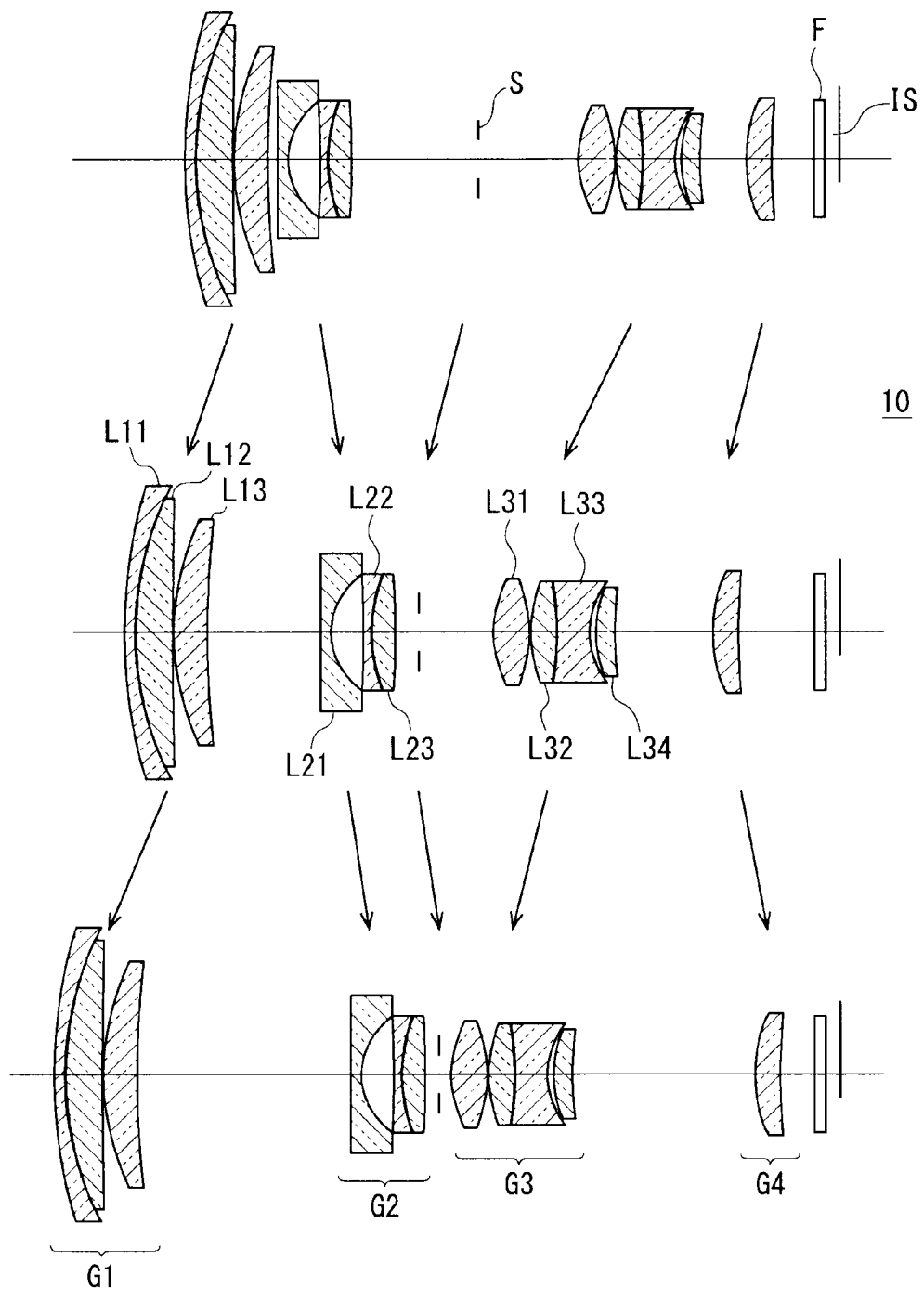
FIG. 1 shows the configuration of a zoom lens according to a first embodiment.
Figure 2:
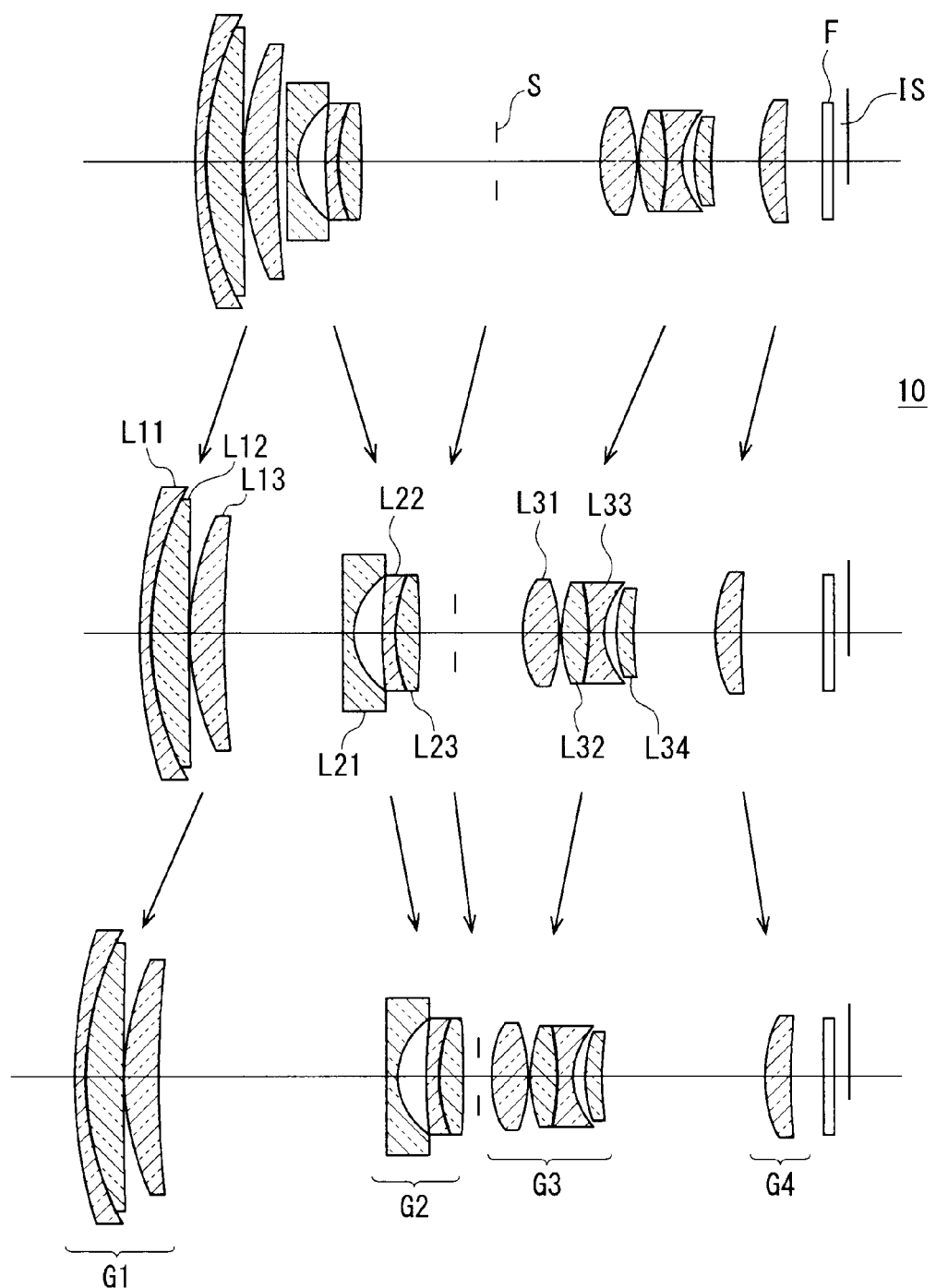
FIG. 2 shows the configuration of a zoom lens according to a second embodiment.
Figure 3:
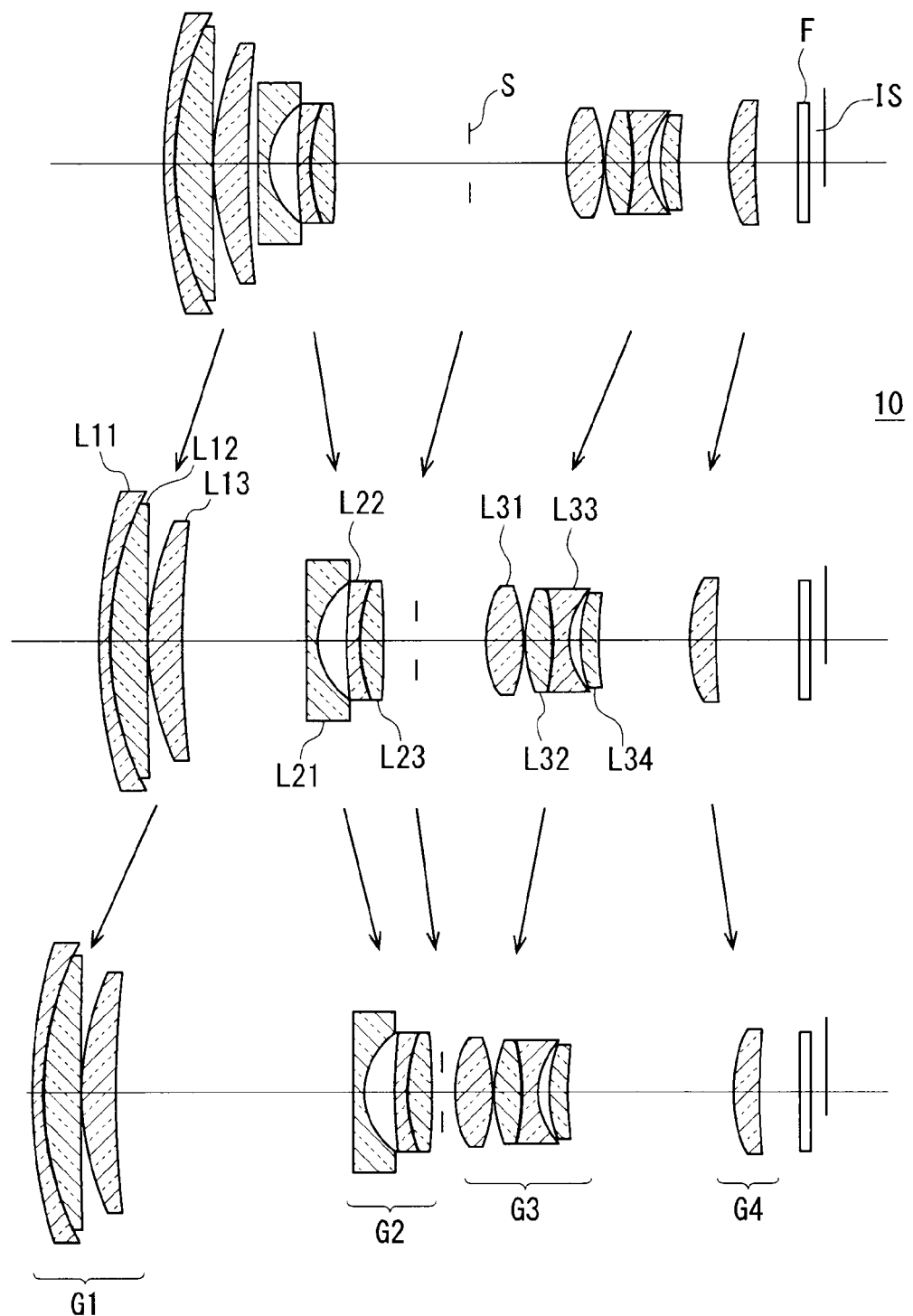
FIG. 3 shows the configuration of a zoom lens according to a third embodiment.
Figure 4:
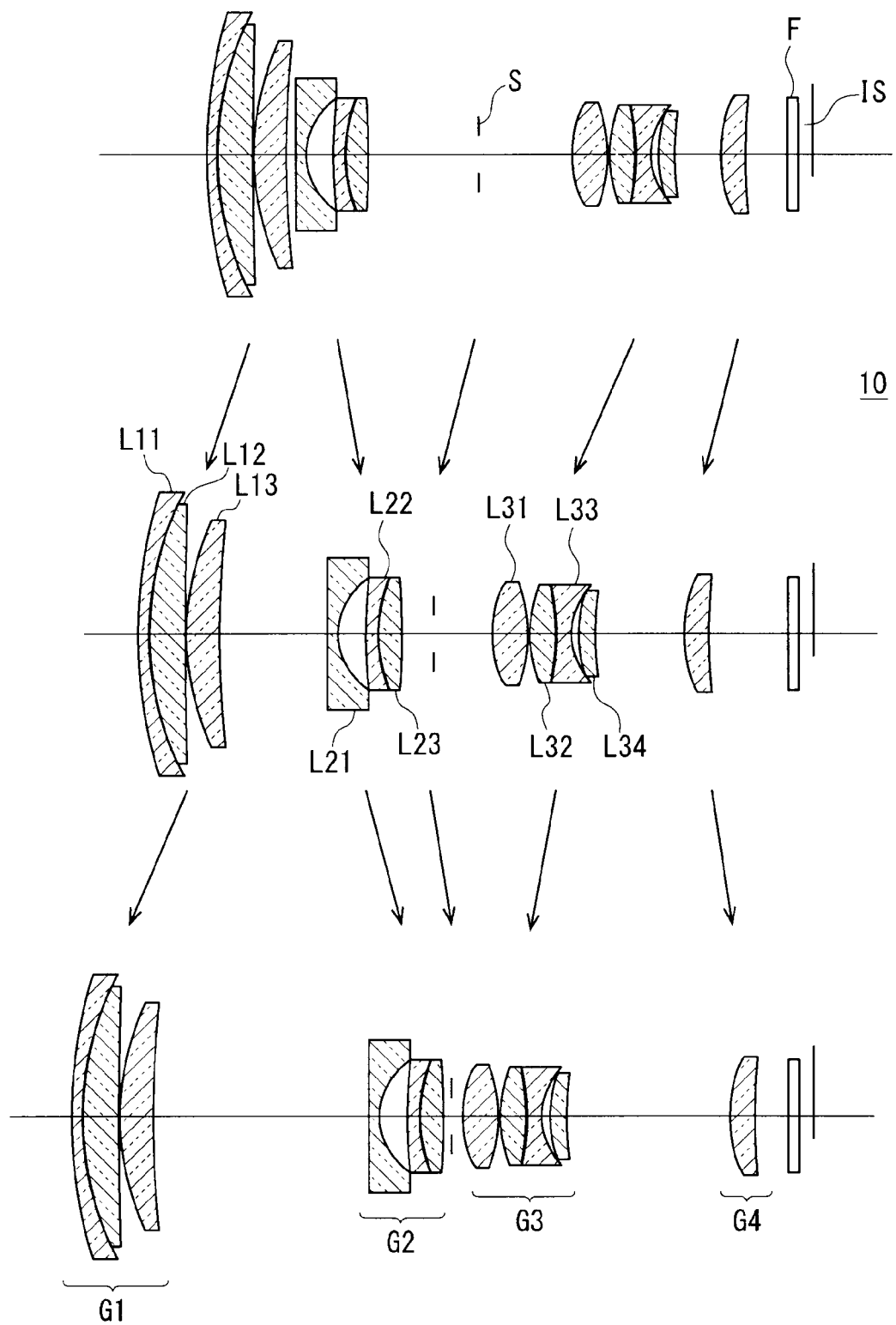
FIG. 4 shows the configuration of a zoom lens according to a fourth embodiment.

Hereinafter, embodiments of the present invention will be described in detail with reference to the accompanying drawings.

FIGS. 1 to 4 show zoom lenses 10 according to later-described first and forth embodiments, respectively. In FIGS. 1 to 4 the same numerals represent the same components.

In FIGS. 1 to 4 the topmost views are lens arrangements at short end or wide angle end, the middle views are lens arrangements at intermediate focal length and the bottom-most views are lens arrangements at long focal end or telephoto end. The arrows indicate positional changes of lens groups while zooming from short focal end to long focal end.

The zoom lenses 10 are each comprised of a first lens group G1 having a positive refractive power, a second lens group G2 having a negative optical power, a third lens group G3 having a positive refractive power, a fourth lens group G4 having a positive refractive power and a filter F arranged in this order from the object side (leftward in the drawings). Each of the zoom lenses 10 is configured that in zooming from the short focal end to the long focal end, an interval between the first and second lens groups G1, G2 increases, an interval between the second and third lens groups G2, G3 decreases, an interval between the third and fourth lens groups G3, G4 increases and the first and third lens groups G1, G3 are positioned to be closer to the object side at the long focal end than the short focal end.

An aperture stop S is disposed between the second and third lens groups G2, G3. At zooming, it is moved so that an interval between the aperture stop S and the third lens group G3 is wider at the short focal end than at the long focal end.

The third lens group is comprised of a first positive lens L31, a second positive lens L32, a negative lens L33, a third positive lens L34 arranged in this order from the object side.

The first lens group G1 is made up of a doublet lens of a negative meniscus lens L11 and a positive meniscus lens L12 both with a convex surface on the object side, and a positive meniscus lens L13 with a convex surface on the object side.

The second lens group G2 is made up of a concave lens L21 with a large-curvature concave surface on the image plane side and a doublet lens of a concave lens L22 with a large-curvature concave surface on the image plane side and a positive lens L23. The fourth lens group G4 is made up of a single positive lens.

In FIG. 1 to FIG. 4 the filter F is a transparent parallel plate made of various filters as an optical low pass filter, an infrared cutoff filter, or a cover glass for a light receiving element as a CCD sensor. The light receiving face of the image sensor is disposed at an image plane IS.

In the following, the first to twelfth conditions set for the zoom lens 10 according to any one of later-described first to fourth embodiments of the present invention are described.

In the zoom lens 10 comprising four lens groups G1 to G4 in positive, negative, positive, positive lens arrangement, the second lens group G2 is generally set to be a variator to mainly perform zooming function. However, the zoom lens 10 according to the present invention is configured that in addition to the second lens group G2, the third lens group G3 is also set to be variable in magnification to share the zooming function and abate a load on the second lens group, thereby achieving difficult aberration correction due to wider-range, higher zooming operation. Further, in zooming from the short focal end to the long focal end, the first lens group is largely moved to the object side so that light passes through the first lens group at a lower position at the short focal end. This can prevent an increase in the size of the first lens group G1 along with a wider field of view. Further, at the long focal end the interval between the first and second lens groups G1, G2 is set to a large value so that the zoom lens 10 can achieve a long focal length.

Further, in zooming from the short focal end to the long focal end, the interval between the first and second lens groups G1, G2 increases while that between the second and third lens groups G2, G3 decreases. Therefore, the absolute values of magnification of both the second and third lens groups G2, G3 increase to perform zooming function.

At least two of the first to third positive lenses L31, L32 L34 of the third lens group G3 are made from a material with a partial dispersion ratio defined by $P_{g,F} = (n_g - n_F)(n_F - n_C)$ satisfying the following the first to third conditions:

$$1.54 < n_d < 1.7 \quad (1)$$

$$62 < v_d < 80 \quad (2)$$

$$0.008 < P_{g,F} - (-0.001802 * v_d + 0.6483) < 0.050 \quad (3)$$

where $n_d$ is a refractive index relative to a d-line, $v_d$ is Abbe number and $n_g$, $n_F$, $n_C$ are refractive indexes relative to a g-line, a F-line, a C-line, respectively.

To realize a high zoom ratio, especially, to increase the focal length at the long focal end, there is a problem in correcting the second-order spectrum of axial chromatic aberration at telephoto. Also, to widen the angle of view or shorten the focal length at the short focal end, it is difficult to correct the second-order spectrum of chromatic aberration of magnification.

To correct such chromatic aberration, the third lens group G3 of the zoom lens 10 is made from a material with anomalous dispersion to exert specific optical characteristics.

In general it is known that using special low dispersion glass for a lens group of which axial light passes through at a high position is effective to reduce the second-order spectrum of the axial chromatic aberration. In the zoom lens 10 the third lens group G3 is at a second highest position next to the first lens group G1 so that the second-order spectrum of axial chromatic aberration can be sufficiently reduced. Moreover, at least two lenses, i.e., two positive lenses of the third lens group G3 of which light passes through at different positions both function to effectively correct the second-order spectrum of axial chromatic aberration and chromatic aberration of magnification. With only a single lens having anomalous dispersion, the eccentricity of this lens becomes too high, provided with large aberration correcting power.

Optical material with special low dispersion generally has low refractive index and the correcting power for monochromatic aberration is likely to decrease. To effectively reduce both monochromatic and chromatic aberrations with the third lens group of less number of lenses, at least two positive lenses of the zoom lens 10 are made of optical glass with refractive index, Abbe number, and anomalous dispersion which satisfy the first to third conditions. Thus, the third lens group G3 of four lenses can reduce the second-order spectrum of chromatic aberration and sufficiently correct monochromatic aberration.

If the parameter of the first condition is below the lower limit, the third lens group cannot exert sufficient correcting power for monochromatic aberration. If the parameter of the second condition is below the lower limit, the third lens group cannot exert sufficient correcting power for chromatic aberration. If the parameter of the third condition is below the lower limit, the third lens group cannot exert sufficient correcting power for the second-order spectrum of chromatic aberration.

Preferably, the parameters of the first to third conditions take larger values. No optical material which exceeds the upper limits of all the parameters exists, and even if it does, it will be too special and too expensive and unsuitable for practical use.

To be able to correct monochromatic aberration and chromatic aberration, the fourth condition is set as follows:

$$1.0 < f3/fw < 2.5$$

where f3 is focal length of the third lens group and fw is focal length of the entire zoom lens at the short focal end. At the parameter being over the upper limit, the positive optical power of the third lens group is relatively weakened so that the lenses made of a material having anomalous dispersion cannot exert sufficient corrective performance and reduce the second order spectrum. Meanwhile, at the parameter being below the lower limit, the positive optical power of the third lens group is relatively increased so that it cannot correct both chromatic aberration and spherical aberration in a balanced manner. Further, with an increase in the curvature of the lenses, it is difficult to accurately machine the lens surfaces.

The following fifth condition is set for further monochromatic aberration and chromatic aberration:

$$0.3 < f31/f32 < 1.2$$

where f31 is focal length of the first positive lens L31 and f32 is focal length of the second positive lens L32. The positive optical power of the two positive lenses L31, L32 of the third lens group G3 is well-balanced to correct monochromatic aberration and chromatic aberration. Beyond the limits of the parameter, it is difficult to reduce monochromatic aberration and chromatic aberration.

The following sixth condition is also set for further monochromatic aberration and chromatic aberration:

$$0.1 < f3/f34 < 0.6$$

where f3 is focal length of the third lens group G3 and f34 is focal length of the third positive lens L34 of the third lens group G3. That is, with a narrow interval between the principal points of the second and third lens groups G2, G3 at the long focal end, the zoom lens 10 can exert good optical performance. However, at the parameter being over the upper limit, the positive optical power of the third positive lens L34 is relatively strengthened, so that the principal point of the third lens group G3 is shifted to the image side too much. At the parameter being below the lower limit, the positive optical power of the third positive lens L34 is weak, and it cannot correct chromatic aberration sufficiently.

The negative lens L33 of the third group G3 is made from a material satisfying the following seventh and eight conditions:

$$1.80 < n\_n_d < 2.20$$

$$25.0 < n\_v_d < 45.0$$

where $n\_n_d$ is refractive index and $n\_v_d$ is Abbe number. The negative lens L33 is optically balanced with the positive lenses in the third lens group G3 so that the third lens group can reduce monochromatic aberration as well as axial chromatic aberration and chromatic aberration of magnification sufficiently.

At the parameters being outside the upper and lower limits in the seventh and eighth conditions, the third group G3 cannot effectively reduce chromatic aberration.

Further, the negative lens L33 is configured to satisfy the following ninth condition:

$$1.5 < f33/fw < -0.5$$

where f33 is focal length of the negative lens L33 and fw is focal length of the entire zoom lens at the short focal end. Thus, the negative optical power of the negative lens L33 is restricted.

At the parameter exceeding the upper limit, the optical power of the negative lens L33 is excessively low while at the parameter being below the lower limit, it is excessively large. Therefore, the third group G3 cannot reduce monochromatic aberration as well as axial chromatic aberration and chromatic aberration of magnification sufficiently.

To downsize the zoom lens 10, the following tenth condition is set:

$$1.0 < D3/fw < 2.0$$

where D3 is central thickness of the third lens group and fw is focal length of the entire zoom lens at the short focal end. At the parameter exceeding the upper limit, the thickness of the third lens group G3 is too large, and a distance in which it is moved for zooming decreases so that the optical power thereof needs to be increased. Thus, the third lens group G3 cannot correct chromatic aberration. At the parameter being below the lower limit, the thickness of the third group G3 is too thin. The third lens group G3 cannot correct chromatic aberration, either. Alternatively, the third lens group can be placed off-axis in a collapsed state.

With such a lens configuration, it is preferable for reduction of spherical aberration and downsizing that the first positive lens L31 arranged at a closest position to the object among the third lens group and satisfying the first to third conditions is an aspherical lens. Further, the aspherical surface is preferably arranged at a position close to the aperture stop S.

Preferably, the interval between the aperture stop S and the third lens group G3 is set to be longer at the short focal end than at the long focal end. The third lens group G3 made from an anomalous dispersion material is configured to move away from the aperture stop S at the short focal end and to approach it at the long focal end. Thereby, the anomalous dispersion can effectively work for correcting the second-order spectrum of chromatic aberration of magnification at the short focal end and for correcting the second-order spectrum of axial chromatic aberration at the long focal end.

Thus, the zoom lens 10 can properly correct chromatic aberration in the entire zooming range. In addition, at the short focal end the position of light passing through the first lens group G1 can be lowered since the aperture stop S is close to the first lens group. The first lens group G1 can be further downsized.

The interval DSw between the aperture stop S and the third lens group G3 is defined by the following eleventh condition:

$$0.05 < DSw/ft < 0.20$$

where DSw is axial interval between the aperture stop S at the short focal end and a lens surface of the third lens group G3 closest to an object and ft is focal length of the entire zoom lens at the long focal end. At the parameter being below the lower limit, the position of light passing through the third lens group G3 is too low at the short focal end, making it difficult to effectively correct the second-order spectrum of chromatic aberration of magnification at wide angle. Also, the position of light passing through the first lens group G1 is too high at the short focal end, causing an increase in the size of the first lens group G1. At the parameter exceeding the upper limit, the position of light passing through the third lens group G3 is too high, causing the imaging plane to excessively tilt or increasing barrel distortion. Especially, the zoom lens 10 cannot exert good optical performance in wide angle range.

To downsize the zoom lens 10 and improve its performance, the following twelfth condition is set:

$$0.05 < DSw/ft < 0.20$$

where DSw is axial interval between the aperture stop S at the short focal end and a lens surface of the third lens group G3 closest to an object and ft is focal length of the entire zoom lens at the long focal end. At the parameter exceeding the upper limit, the total length of the entire zoom lens becomes long at telephoto end. At the parameter being below the lower limit, the total length at telephoto end is too short and the focal length of each lens group is too short to realize zoom ratio.

Setting the aperture size of the aperture stop S to be larger at the long focal end than the short focal end can decrease a variation in F-number along with zooming. It can be set to a small value when the amount of light reaching the imaging plane needs to be decreased. Insertion of an ND filter is however more preferable than a change in the aperture size since a decrease in resolution by diffraction can be prevented.

Preferably, for focusing, only the fourth lens group G4 is protruded although the entire lens groups can be protruded.

Next, an example of a hand-held data terminal device is described with reference to FIGS. 17A, 17B and FIG. 18. The hand-held data terminal device 20 in FIGS. 17A, 17B comprises a viewfinder 2, a strobe light portion 3, a shutter button 4, a body 5, a power-on switch 6, a liquid crystal display (LCD) 7, an operation button 8, and a memory card throttle 9.

Figure 18:
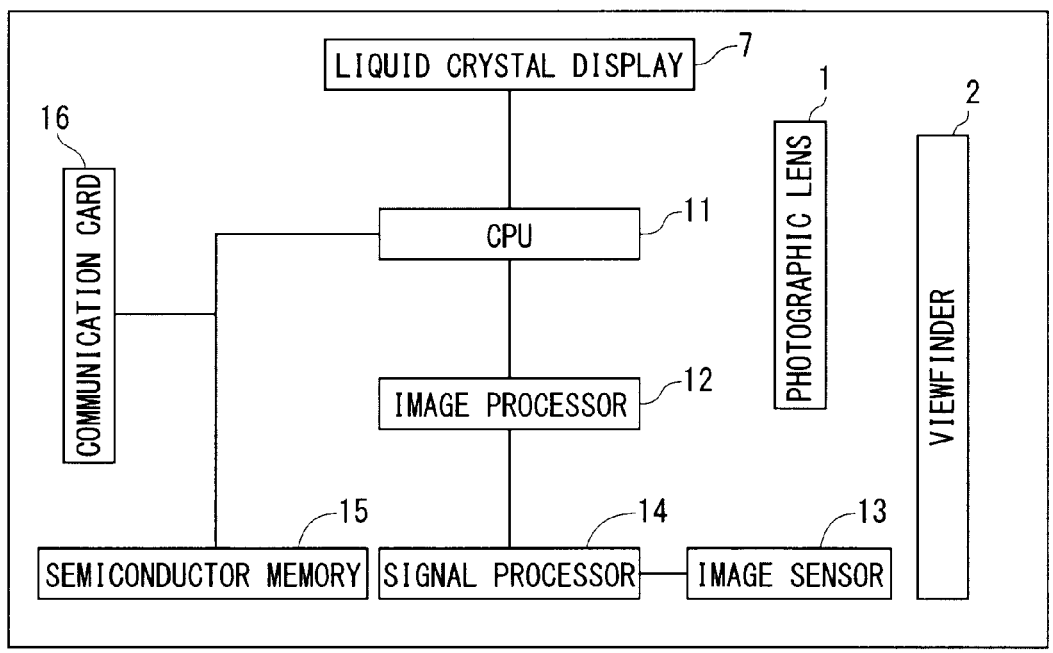
FIG. 18 shows an example of the system structure of the hand-held data terminal device.

FIG. 18 shows a system configuration of the hand-held data terminal device 20. It includes a photographic lens 1 as the zoom lens 10 according to any one of the first to fourth embodiments of the present invention, a light receiving element 13 to receive an optical image of a subject formed by the photographic lens 1 and a signal processor 14 to convert outputs from the light receiving element 13 into digital data under the control of a CPU 11.

Converted digital image data is processed by an image processor 12 for image display on the LCD 7 or for storage in a semiconductor memory 15. The image data can be transmitted to outside through a communication card 16 which is accommodated in the memory card throttle 9. The hand-held data terminal device 20 excluding this communication function is a camera device.

Images during shooting and image data stored in the semiconductor memory 15 can be displayed on the LCD 7.

Figure 17A:
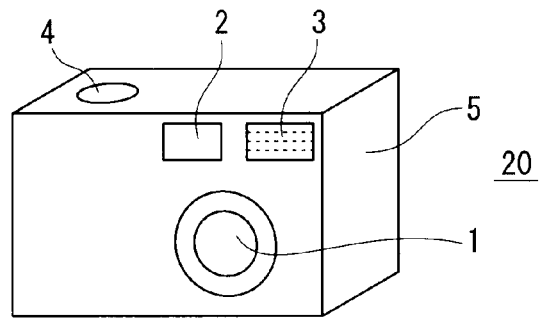
FIG. 17A is a front view of an example of a hand-held data terminal device.
Figure 17B:
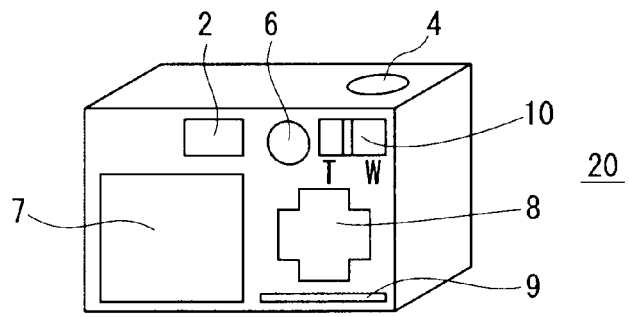
FIG. 17B is a back view thereof.

The photographic lens 1 is collapsed into the body 5 during non-use in FIG. 17A, and protruded therefrom upon turning-on of the power-on switch 6. When protruded, the lens groups G1 to G4 of the zoom lens 10 are positioned at a wide angle end in a lens barrel, for example. The positions of the lens groups are changed by manipulation of a not-shown zoom lever to zoom to a telephoto end. Along with a change in the angle of view of the photographic lens, the viewfinder 2 also zooms.

Upon a half-press to the shutter button 4, the camera device focuses on a subject. To focus on the subject, the fourth lens group G4 is moved or alternatively, the light receiving element can be moved. Upon a full press to the shutter button 4, the subject is shot.

By manipulating the operation button 8, the image stored in the semiconductor memory 15 is displayed on the LCD 7 or transmitted to outside via the communication card 16. The semiconductor memory 15 and the communication card 16 are inserted into a dedicated or general purpose throttle 9.

With the photographic lens 1 in a collapsed state, the first to fourth lens groups G1 to G4 do not need to be aligned on the optical axis. For example, either or both of the third and fourth lens groups G3, G4 can be placed off-axis to be accommodated in the camera body in parallel to the other lens groups. In this manner, it is possible to reduce the thickness of the hand-held data terminal device 20. Since the third lens group G3 is larger in size in the optical axis direction than the fourth lens group G4, placing the third lens group G3 away from the optical axis is more effective to reduce the thickness of the device in a collapsed state.

In the following four examples of the zoom lens 10 will be described. The material of all the lenses is optical glass except for the positive lens constituting the fourth lens group G4 which is made from optical plastic.

Numeral codes and symbols used hereinafter denote as follows:

Si: i-th lens surface from the object side
f: total focal length of lens system
F: F-number
ω: half field of angle (degree)
Di: interval between i-th lens surface and i+1$^{th}$ lens surface on the axis
Ri: curvature radius of i-th lens surface from the object side
$N_d$: refractive index
$v_d$: Abbe number
φ effective beam size
K: conic constant of aspheric surface
$A_4$: fourth order aspheric coefficient
$A_6$: sixth order aspheric coefficient
$A_8$: eighth order aspheric coefficient
$A_{10}$: tenth order aspheric coefficient The aspheric surface is expressed by the following known formula:

$$X = CH^2 / \{1 + \sqrt{(1-(1+K)C^2H^2)}\} + A_4 \cdot H^4 + A_6 \cdot H^6 + A_8 \cdot H^8 + A_{10} \cdot H^{10} \ldots$$

where X is a depth in the optical axis direction, C is a paraxial curvature (inverse of paraxial curvature radius), H is height from the optical axis, K is a conic constant of aspheric surface, and $A_4$ to $A_{10}$ are high-order aspheric coefficients.

First Embodiment

The following table 1 shows specific data on the lenses of the first to fourth lens groups G1 to G4.

TABLE 1

| Si | Ri | Di | Nd | vd | φ | GLASS |
|---|---|---|---|---|---|---|
| 1 | 34.706 | 0.80 | 1.92286 | 20.88 | 20.60 | E-FDS1(HOYA) |
| 2 | 22.489 | 2.80 | 1.59282 | 68.63 | 19.00 | FCD505(HOYA) |
| 3 | 166.457 | 0.10 | | | 18.00 | |

TABLE 1-continued

| Si | Ri | Di | Nd | vd | φ | GLASS |
|---|---|---|---|---|---|---|
| 4 | 19.774 | 2.47 | 1.72916 | 54.68 | 16.60 | S-LAL18(OHARA) |
| 5 | 63.997 | VARIABLE (A) | | | 16.20 | |
| 6 | −1009.751 | 0.80 | 1.86400 | 40.58 | 11.00 | L-LAH83(OHARA) |
| 7* | 5.273 | 2.18 | | | 8.00 | |
| 8 | −115.007 | 0.80 | 1.80400 | 46.57 | 7.80 | S-LAH65(OHARA) |
| 9 | 10.462 | 1.69 | 2.00272 | 19.32 | 7.60 | EFDS2 (HOYA) |
| 10* | 95.304 | VARIABLE (B) | | | 7.30 | |
| 11 | DIAPHRAGM | VARIABLE (C) | | | 3.20 | |
| 12* | 7.257 | 2.71 | 1.55332 | 71.68 | 7.00 | M-FCD500(HOYA) |
| 13* | −10.338 | 0.15 | | | 7.20 | |
| 14 | 12.563 | 1.81 | 1.61800 | 63.33 | 7.00 | S-PHM52(OHARA) |
| 15 | −20.232 | 2.32 | 1.91082 | 35.25 | 6.60 | TAFD35(HOYA) |
| 16 | 5.428 | 0.49 | | | 5.80 | |
| 17 | 7.244 | 1.35 | 1.59282 | 68.63 | 6.00 | FCD505(HOYA) |
| 18 | 15.289 | VARIABLE (D) | | | 6.00 | |
| 19* | 11.000 | 1.88 | 1.52528 | 56.20 | 8.80 | RESIN |
| 20 | 50.380 | VARIABLE (E) | | | 8.60 | |
| 21 | ∞ | 0.80 | 1.50000 | 64.00 | 8.40 | FILTER |
| 22 | ∞ | | | | 8.40 | |

In the table 1 and following tables asterisk * indicates that the lens surface is aspheric.

The following table 2 shows aspheric coefficients.

TABLE 2

| Si | K | A4 | A6 | A8 | A10 |
|---|---|---|---|---|---|
| 7 | 0.23585 | 4.72356E−05 | −1.30060E−06 | 1.23471E−06 | −8.72242E−08 |
| 10 | 0 | −3.49845E−04 | −1.13584E−05 | 9.55995E−07 | −3.87934E−08 |
| 12 | −3.31561 | 4.50546E−04 | −7.94172E−07 | −4.24923E−07 | −2.82030E−08 |
| 13 | 0 | 1.72770E−04 | 7.90104E−06 | −2.30345E−07 | −4.16517E−08 |
| 19 | 0 | −2.54168E−05 | 6.64933E−06 | −3.23958E−07 | 7.07958E−09 |

The following table 3 shows variable amounts among the lenses in question in the table 1. In the table 3 Wide signifies short focal end, Mean signifies intermediate focal length, and Telephoto signifies long focal end.

TABLE 3

| | Wide | Mean | Telephoto |
|---|---|---|---|
| f | 5.05 | 16.00 | 52.51 |
| F-NUMBER | 3.59 | 4.91 | 6.16 |
| ω | 41.10 | 14.52 | 4.35 |
| A | 0.621 | 8.097 | 15.615 |
| B | 9.581 | 2.040 | 1.000 |
| C | 7.334 | 5.524 | 0.950 |
| D | 3.500 | 7.275 | 13.487 |
| E | 2.808 | 5.532 | 2.623 |

The aperture size is set to φ3.3 (mm) at Wide and Mean and to φ4.0 at Telephoto.

The parameters of the first to twelfth conditions are shown in the following table 4.

TABLE 4

| L31 | $n_d$ | 1.55332 |
|---|---|---|
| | $v_d$ | 71.68 |
| | $P_{g,F} - (-0.001802 \times v_d + 0.6483)$ | 0.0211 |
| L32 | $n_d$ | 1.61800 |
| | $v_d$ | 63.33 |
| | $P_{g,F} - (-0.001802 \times v_d + 0.6483)$ | 0.0099 |
| L34 | $n_d$ | 1.59282 |
| | $v_d$ | 68.63 |
| | $P_{g,F} - (-0.001802 \times v_d + 0.6483)$ | 0.0195 |
| f3/fw | | 2.04 |
| f31/f32 | | 0.64 |
| f3/f34 | | 0.47 |
| n_nd | | 1.91082 |
| n_vd | | 35.25 |
| f33/fw | | −0.89 |
| D3/fw | | 1.75 |
| DSw/ft | | 1.45 |
| Tlt/ft | | 1.10 |

Second Embodiment

The following table 5 shows specific data on the lenses of the first to fourth lens groups G1 to G4 according to the second embodiment.

TABLE 5

| Si | Ri | Di | Nd | vd | φ | GLASS |
|---|---|---|---|---|---|---|
| 1 | 40.079 | 0.80 | 1.92286 | 20.88 | 20.60 | E-FDS1(HOYA) |
| 2 | 25.049 | 2.73 | 1.59282 | 68.63 | 19.20 | FCD505(HOYA) |
| 3 | 282.248 | 0.10 | | | 18.40 | |
| 4 | 20.635 | 2.50 | 1.72916 | 54.68 | 17.00 | S-LAL18(OHARA) |
| 5 | 64.380 | VARIABLE (A) | | | 16.60 | |
| 6 | −433.617 | 0.80 | 1.86400 | 40.58 | 11.20 | L-LAH83(OHARA) |
| 7* | 5.369 | 2.09 | | | 8.20 | |
| 8 | 54.416 | 0.88 | 1.80400 | 46.57 | 8.00 | S-LAH65(OHARA) |
| 9 | 9.195 | 1.74 | 2.00272 | 19.32 | 7.60 | EFDS2 (HOYA) |

TABLE 5-continued

| Si | Ri | Di | Nd | vd | φ | GLASS |
|---|---|---|---|---|---|---|
| 10* | 35.000 | VARIABLE (B) | | | 7.20 | |
| 11 | DIAPHRAGM | VARIABLE (C) | | | 3.20 | |
| 12* | 6.881 | 2.71 | 1.55332 | 71.68 | 7.00 | M-FCD500(HOYA) |
| 13* | −11.192 | 0.15 | | | 7.20 | |
| 14 | 9.255 | 2.06 | 1.61800 | 63.33 | 6.80 | S-PHM52(OHARA) |
| 15 | −18.688 | 1.12 | 1.91082 | 35.25 | 6.40 | TAFD35(HOYA) |
| 16 | 5.304 | 0.90 | | | 5.60 | |
| 17 | 9.443 | 1.22 | 1.59522 | 67.74 | 6.00 | S-FPM2(OHARA) |
| 18 | 15.770 | VARIABLE (D) | | | 6.00 | |
| 19* | 11.000 | 2.00 | 1.52528 | 56.20 | 8.60 | RESIN |
| 20 | 47.111 | VARIABLE (E) | | | 8.40 | |
| 21 | ∞ | 0.80 | 1.50000 | 64.00 | 8.40 | FILTER |
| 22 | ∞ | | | | 8.40 | |

In the table 5 and following tables asterisk * indicates that the lens surface is aspheric.

The following table 6 shows aspheric coefficients.

TABLE 6

| Si | K | A4 | A6 | A8 | A10 |
|---|---|---|---|---|---|
| 7 | 0.22345 | 4.50939E−05 | −1.17600E−06 | 5.73905E−07 | −6.03124E−08 |
| 10 | 0 | −3.83893E−04 | −9.13083E−06 | 8.56166E−07 | −3.92323E−08 |
| 12 | −2.8564 | 5.05513E−04 | −1.49477E−06 | −2.00417E−07 | −1.68188E−08 |
| 13 | 0 | 1.85707E−04 | 7.93896E−06 | −2.11638E−07 | −2.33152E−08 |
| 19 | 0 | −8.97698E−06 | 4.25153E−06 | −1.94988E−07 | 4.70614E−09 |

The following table 7 shows variable amounts among the lenses in question in the table 5.

TABLE 7

| | Wide | Mean | Telephoto |
|---|---|---|---|
| f | 5.05 | 16.00 | 52.49 |
| F-NUMBER | 3.57 | 5.00 | 5.77 |
| ω | 41.13 | 14.50 | 4.34 |
| A | 0.652 | 8.876 | 17.239 |
| B | 9.964 | 2.768 | 1.000 |
| C | 7.697 | 4.900 | 0.950 |
| D | 3.500 | 5.970 | 11.916 |
| E | 2.799 | 6.228 | 2.677 |

The aperture size is set to φ3.2 (mm) at Wide and Mean and to φ4.0 at Telephoto.

The parameters of the first to twelfth conditions are shown in the following table 8.

TABLE 8

| L31 | $n_d$ | 1.55332 |
|---|---|---|
| | $v_d$ | 71.68 |
| | $P_{g,F} - (-0.001802 \times v_d + 0.6483)$ | 0.0211 |
| L32 | $n_d$ | 1.61800 |
| | $v_d$ | 63.33 |
| | $P_{g,F} - (-0.001802 \times v_d + 0.6483)$ | 0.0099 |
| L34 | $n_d$ (FCD505) | 1.59522 |
| | $v_d$ (FCD505) | 67.74 |
| | $P_{g,F} - (-0.001802 \times v_d + 0.6483)$ | 0.0180 |
| f3/fw | | 2.07 |
| f31/f32 | | 0.79 |
| f3/f34 | | 0.28 |
| n_nd | | 1.91082 |
| n_vd | | 35.25 |
| f33/fw | | −0.88 |
| D3/fw | | 1.62 |
| DSw/ft | | 1.53 |
| Tlt/ft | | 1.09 |

Third Embodiment

The following table 9 shows specific data on the lenses of the first to fourth lens groups G1 to G4 according to the third embodiment.

TABLE 9

| Si | Ri | Di | Nd | vd | φ | GLASS |
|---|---|---|---|---|---|---|
| 1 | 37.615 | 0.80 | 1.92286 | 20.88 | 20.60 | E-FDS1(HOYA) |
| 2 | 23.850 | 2.76 | 1.59282 | 68.63 | 19.20 | FCD505(HOYA) |
| 3 | 211.577 | 0.10 | | | 18.40 | |
| 4 | 20.395 | 2.52 | 1.72916 | 54.68 | 17.00 | S-LAL18(OHARA) |
| 5 | 64.300 | VARIABLE (A) | | | 16.60 | |
| 6 | 1506.898 | 0.80 | 1.86400 | 40.58 | 11.20 | L-LAH83(OHARA) |
| 7* | 5.289 | 2.11 | | | 8.00 | |
| 8 | 79.191 | 0.80 | 1.80400 | 46.57 | 7.60 | S-LAH65(OHARA) |
| 9 | 8.993 | 1.72 | 2.00272 | 19.32 | 7.40 | EFDS2 (HOYA) |
| 10* | 35.000 | VARIABLE (B) | | | 7.20 | |
| 11 | DIAPHRAGM | VARIABLE (C) | | | 3.30 | |
| 12* | 6.782 | 2.77 | 1.59255 | 67.86 | 7.00 | Q-PSKHIS (OPTICAL GLASS) |
| 13* | −11.179 | 0.15 | | | 7.20 | |
| 14 | 11.997 | 2.10 | 1.61800 | 63.33 | 6.80 | S-PHM52(OHARA) |
| 15 | −8.234 | 1.10 | 1.83400 | 37.16 | 6.40 | S-LAH60(OHARA) |

TABLE 9-continued

| Si | Ri | Di | Nd | vd | φ | GLASS |
|---|---|---|---|---|---|---|
| 16 | 5.352 | 0.60 | | | 5.80 | |
| 17 | 8.625 | 1.37 | 1.59282 | 68.63 | 5.80 | FCD505(HOYA) |
| 18 | 15.487 | VARIABLE (D) | | | 6.00 | |
| 19* | 11.000 | 1.96 | 1.52528 | 56.20 | 8.60 | RESIN |
| 20 | 51.475 | VARIABLE (E) | | | 8.60 | |
| 21 | ∞ | 0.80 | 1.50000 | 64.00 | 8.40 | FILTER |
| 22 | ∞ | | | | 8.40 | |

In the table 9 and following tables asterisk * indicates that the lens surface is aspheric.

The following table 10 shows aspheric coefficients.

TABLE 10

| Si | K | A4 | A6 | A8 | A10 |
|---|---|---|---|---|---|
| 7 | 0.28732 | 4.46070E−05 | −2.65405E−06 | 1.19352E−06 | −9.83967E−08 |
| 10 | 0 | −4.00114E−04 | −1.39893E−05 | 1.32931E−06 | −5.78537E−08 |
| 12 | −2.79839 | 5.30690E−04 | −6.47677E−07 | −2.58575E−07 | −1.21584E−08 |
| 13 | 0 | 1.70416E−04 | 5.95691E−06 | −6.48031E−08 | −2.67860E−08 |
| 19 | 0 | −8.66102E−06 | 4.66725E−06 | −1.90339E−07 | 4.62004E−09 |

The following table 11 shows variable amounts among the lenses in question in the table 9.

TABLE 11

| | Wide | Mean | Telephoto |
|---|---|---|---|
| f | 5.05 | 16.01 | 52.49 |
| F-NUMBER | 3.48 | 4.74 | 5.44 |
| ω | 41.09 | 14.52 | 4.35 |
| A | 0.600 | 8.768 | 16.926 |
| B | 9.766 | 2.466 | 1.000 |
| C | 7.055 | 5.099 | 0.950 |
| D | 3.500 | 6.519 | 11.857 |
| E | 2.822 | 5.844 | 2.726 |

The aperture size is set to φ3.3 (mm) at Wide and Mean and to φ4.2 at Telephoto.

The parameters of the first to twelfth conditions are shown in the following table 12.

TABLE 12

| L31 | $n_d$ | 1.59255 |
|---|---|---|
| | $v_d$ | 67.86 |
| | $P_{g,F} - (-0.001802 \times v_d + 0.6483)$ | 0.0181 |
| L32 | $n_d$ | 1.61800 |
| | $v_d$ | 63.33 |
| | $P_{g,F} - (-0.001802 \times v_d + 0.6483)$ | 0.0099 |
| L34 | $n_d$ (FCD505) | 1.59282 |
| | $v_d$ (FCD505) | 68.63 |
| | $P_{g,F} - (-0.001802 \times v_d + 0.6483)$ | 0.0195 |
| f3/fw | | 2.02 |
| f31/f32 | | 0.92 |
| f3/f34 | | 0.33 |
| n_nd | | 1.83400 |
| n_vd | | 37.16 |
| f33/fw | | −0.74 |
| D3/fw | | 1.60 |
| DSw/ft | | 1.40 |
| Tlt/ft | | 1.08 |

Fourth Embodiment

The following table 13 shows specific data on the lenses of the first to fourth lens groups G1 to G4 according to the third embodiment.

TABLE 13

| Si | Ri | Di | Nd | vd | φ | GLASS |
|---|---|---|---|---|---|---|
| 1 | 38.820 | 0.80 | 1.92286 | 20.88 | 21.00 | E-FDS1(HOYA) |
| 2 | 24.109 | 2.82 | 1.59282 | 68.63 | 19.40 | FCD505(HOYA) |
| 3 | 349.797 | 0.10 | | | 18.40 | |
| 4 | 20.194 | 2.63 | 1.72916 | 54.68 | 17.00 | S-LAL18(OHARA) |
| 5 | 65.282 | VARIABLE (A) | | | 16.40 | |
| 6 | −831.457 | 0.80 | 1.86400 | 40.58 | 11.00 | L-LAH83(OHARA) |
| 7* | 5.057 | 1.88 | | | 7.80 | |
| 8 | 29.477 | 0.80 | 1.80400 | 46.57 | 7.80 | S-LAH65(OHARA) |
| 9 | 7.397 | 1.71 | 2.00272 | 19.32 | 7.40 | EFDS2 (HOYA) |
| 10* | 21.172 | VARIABLE (B) | | | 6.90 | |
| 11 | DIAPHRAGM | VARIABLE (C) | | | 3.00 | |
| 12* | 7.176 | 2.66 | 1.55332 | 71.68 | 7.00 | M-FCD500(HOYA) |
| 13* | −10.147 | 0.15 | | | 7.40 | |
| 14 | 9.666 | 1.81 | 1.59282 | 68.63 | 7.00 | FCD505(OHARA) |
| 15 | −2225.496 | 1.26 | 1.90366 | 31.32 | 6.60 | TAFD25(HOYA) |
| 16 | 5.488 | 0.67 | | | 5.80 | |
| 17 | 9.248 | 1.19 | 1.60300 | 65.44 | 6.00 | SPHM53(OHARA) |
| 18 | 12.000 | VARIABLE (D) | | | 6.00 | |
| 19* | 11.000 | 2.00 | 1.52528 | 56.20 | 8.80 | RESIN |

TABLE 13-continued

| Si | Ri | Di | Nd | vd | φ | GLASS |
|---|---|---|---|---|---|---|
| 20 | 88.969 | VARIABLE (E) | | | 8.80 | |
| 21 | ∞ | 0.80 | 1.50000 | 64.00 | 8.40 | FILTER |
| 22 | ∞ | | | | 8.40 | |

In the table 13 and following tables asterisk * indicates that the lens surface is aspheric.

The following table 14 shows aspheric coefficients.

TABLE 14

| Si | K | A4 | A6 | A8 | A10 |
|---|---|---|---|---|---|
| 7 | 0.178 | 1.50346E−04 | −3.62825E−06 | 1.78566E−06 | −1.05930E−07 |
| 10 | 0 | −5.05076E−04 | −1.30078E−05 | 8.68069E−07 | −4.20923E−08 |
| 12 | −3.42487 | 4.23812E−04 | −1.46608E−06 | −3.16246E−07 | −2.72042E−08 |
| 13 | 0 | 1.81877E−04 | 9.49327E−06 | −2.30672E−07 | −3.78247E−08 |
| 19 | 0 | 3.29447E−07 | 5.72839E−06 | −2.73845E−07 | 5.72923E−09 |

The following table 15 shows variable amounts among the lenses in question in the table 13.

TABLE 15

| | Wide | Mean | Telephoto |
|---|---|---|---|
| f | 5.05 | 15.99 | 52.48 |
| F-NUMBER | 3.57 | 5.18 | 5.88 |
| ω | 41.08 | 14.51 | 4.34 |
| A | 0.608 | 8.516 | 16.327 |
| B | 8.446 | 2.696 | 1.000 |
| C | 7.291 | 4.434 | 0.950 |
| D | 3.500 | 6.830 | 12.439 |
| E | 2.979 | 5.927 | 2.645 |

The aperture size is set to φ3.0 (mm) at Wide and Mean and to φ3.8 at Telephoto.

The parameters of the first to twelfth conditions are shown in the following table 16.

TABLE 16

| L31 | $n_d$ | 1.55332 |
|---|---|---|
| | $v_d$ | 71.68 |
| | $P_{g,F} - (-0.001802 \times v_d + 0.6483)$ | 0.0211 |
| L32 | $n_d$ | 1.59282 |
| | $v_d$ | 68.63 |
| | $P_{g,F} - (-0.001802 \times v_d + 0.6483)$ | 0.0195 |
| L34 | $n_d$ (FCD505) | 1.60300 |
| | $v_d$ (FCD505) | 65.44 |
| | $P_{g,F} - (-0.001802 \times v_d + 0.6483)$ | 0.0097 |
| f3/fw | | 1.97 |
| f31/f32 | | 0.49 |
| f3/f34 | | 0.17 |
| n__nd | | 1.90366 |
| n__vd | | 31.32 |
| f33/fw | | −1.20 |
| D3/fw | | 1.53 |
| DSw/ft | | 1.45 |
| Tlt/ft | | 1.08 |

Figure 7:
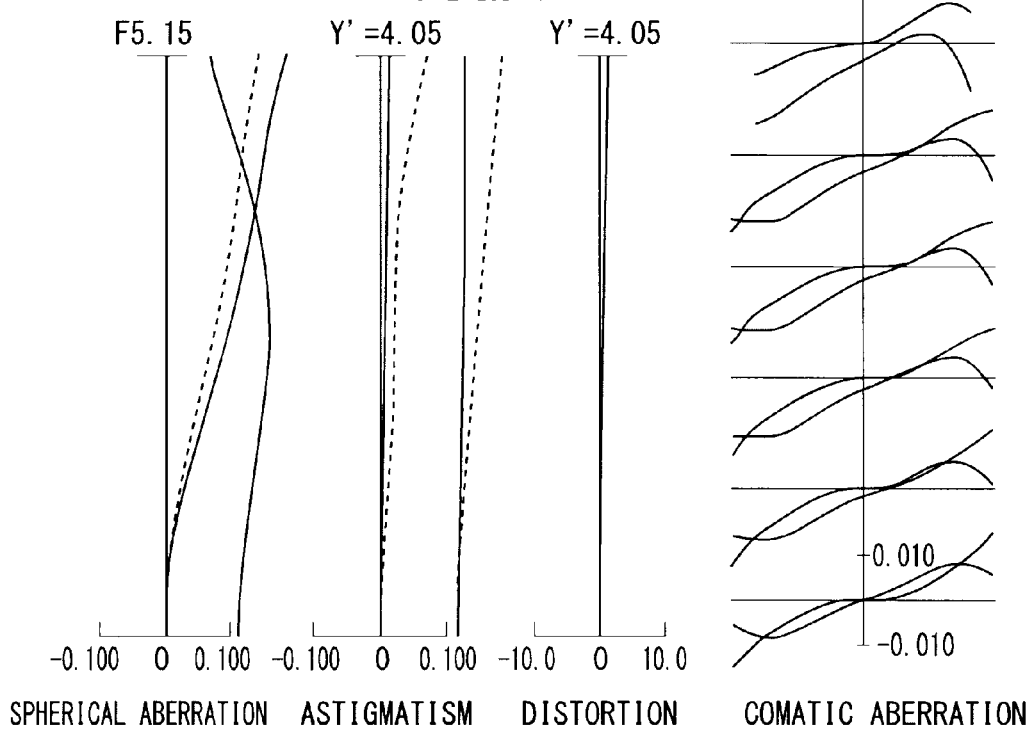
FIG. 7 shows the aberration curves of the zoom lens at long focal end according to the first embodiment.
Figure 8:
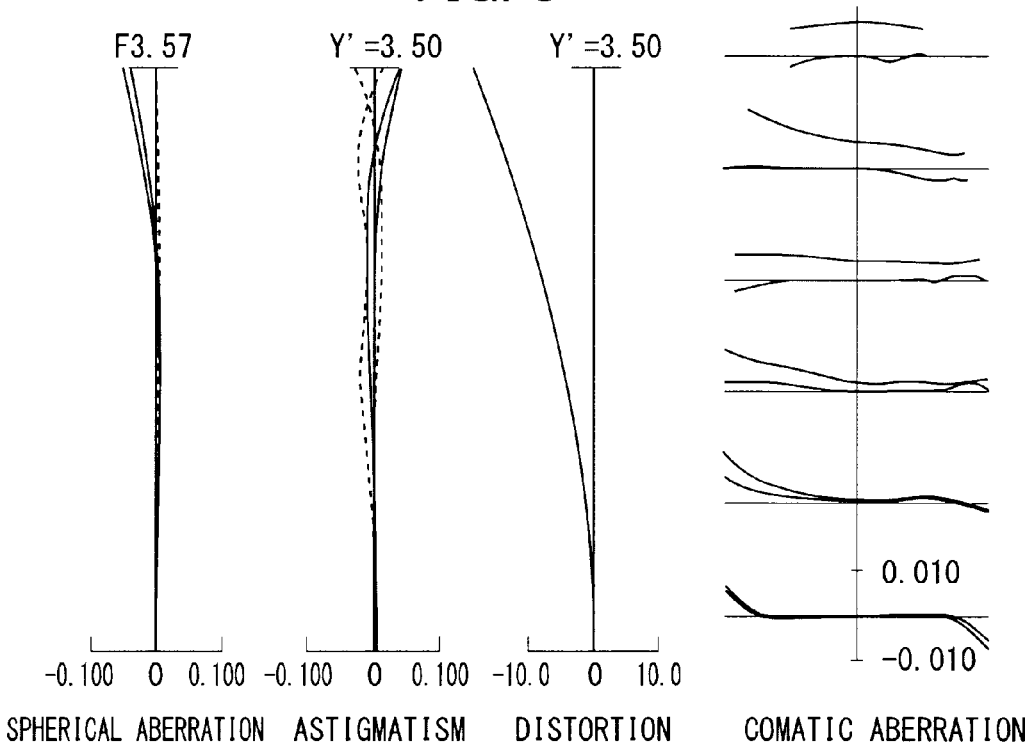
FIG. 8 shows the aberration curves of the zoom lens at short focal end according to the second embodiment.
Figure 9:
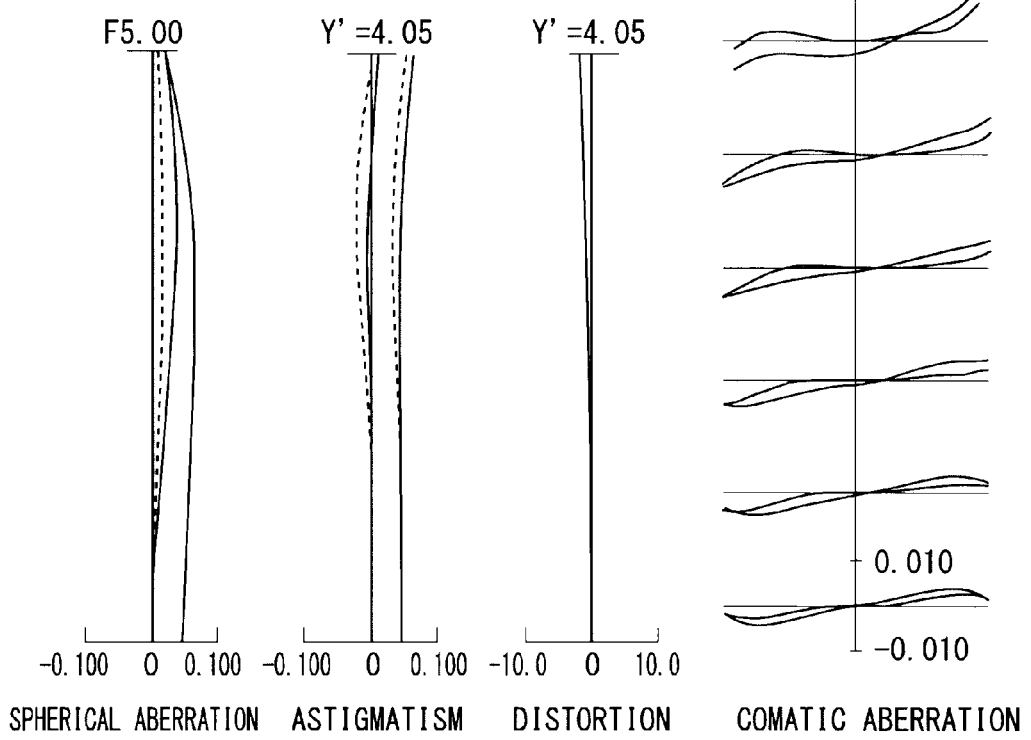
FIG. 9 shows the aberration curves of the zoom lens at an intermediate focal length according to the second embodiment.
Figure 10:
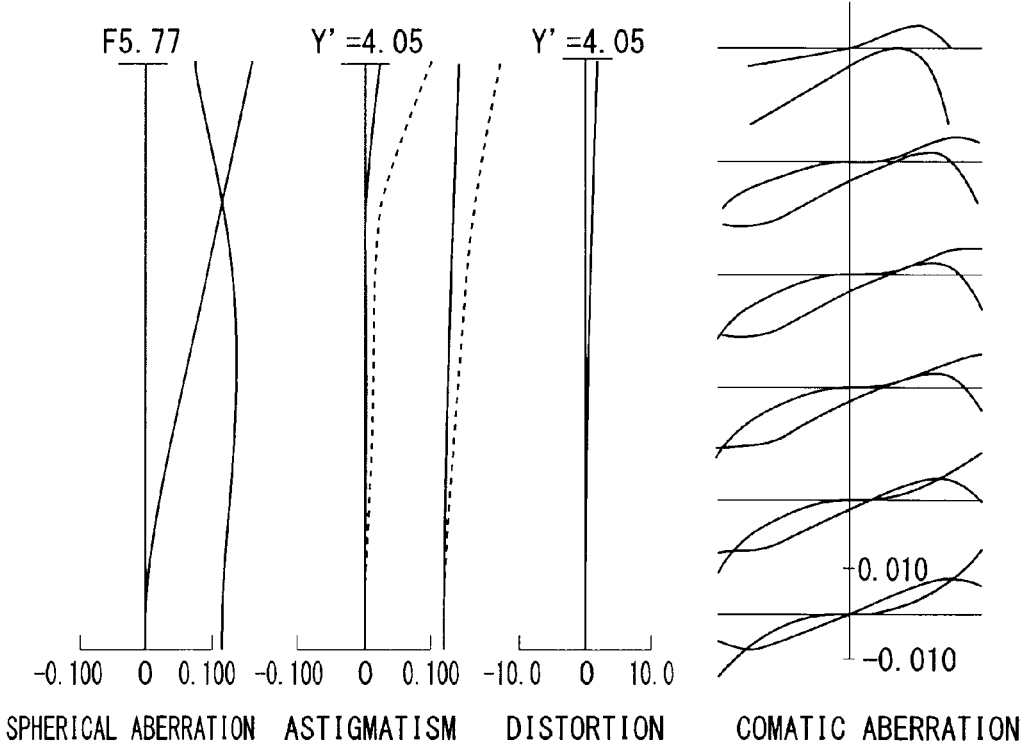
FIG. 10 shows the aberration curves of the zoom lens at long focal end according to the second embodiment.
Figure 13:
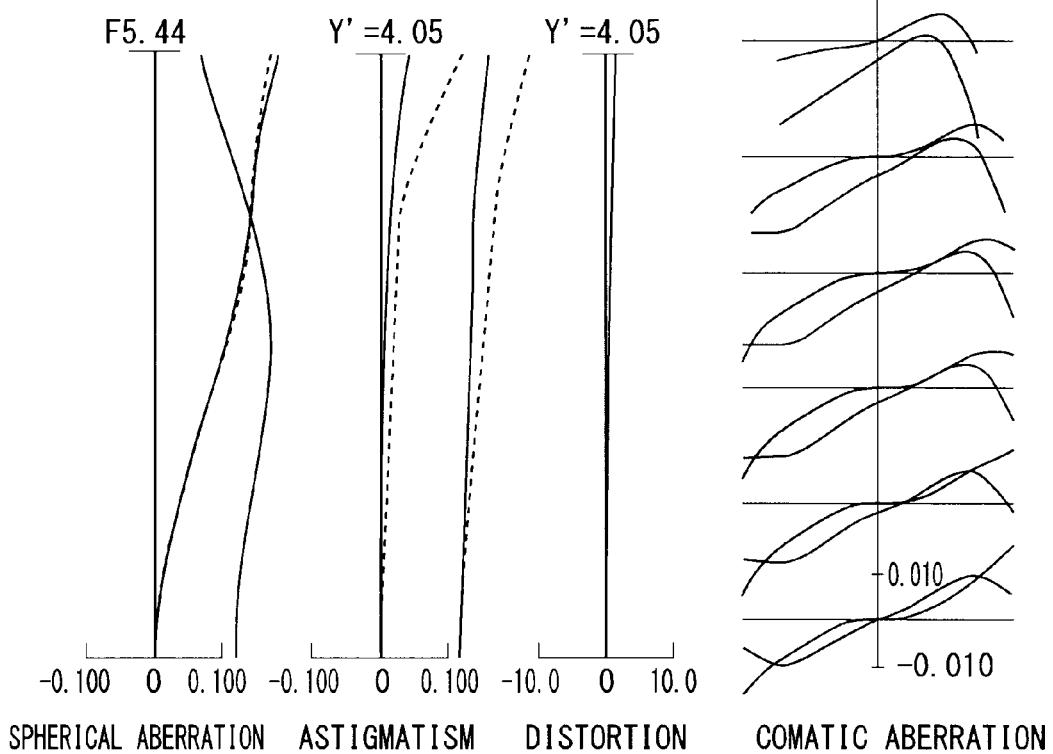
FIG. 13 shows the aberration curves of the zoom lens at long focal end according to the third embodiment.
Figure 14:
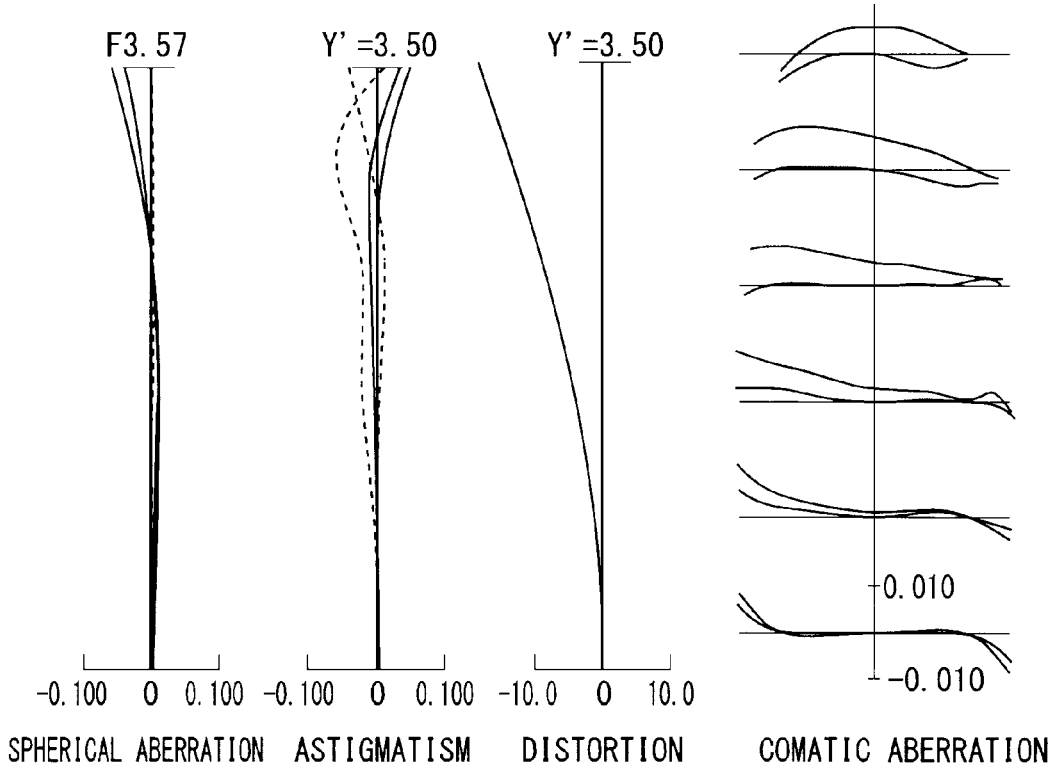
FIG. 14 shows the aberration curves of the zoom lens at short focal end according to the fourth embodiment.
Figure 15:
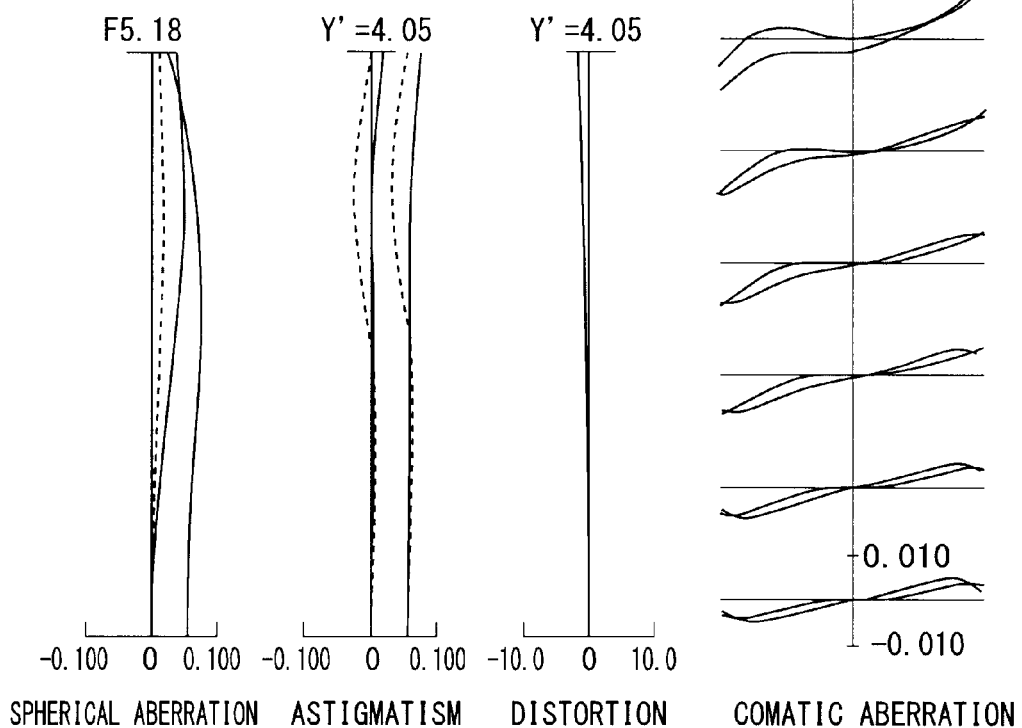
FIG. 15 shows the aberration curves of the zoom lens at intermediate focal length end according to the fourth embodiment.
Figure 16:
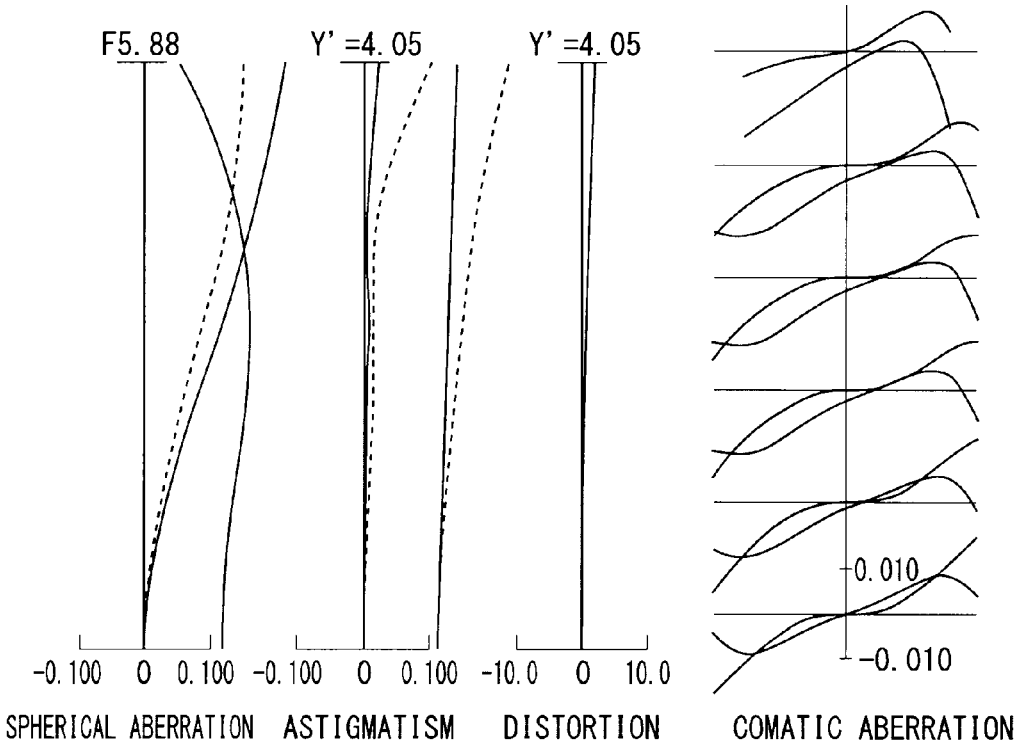
FIG. 16 shows the aberration curves of the zoom lens at long focal end according to the fourth embodiment.

FIGS. 5 to 7 show the aberration curves of the zoom lens 10 at short focal end, intermediate focal length, and long focal end according to the first embodiment, respectively. FIGS. 8 to 10 show the aberration curves of the zoom lens 10 at short focal end, intermediate focal length, and long focal end according to the second embodiment, respectively. FIGS. 11 to 13 show the aberration curves of the zoom lens 10 at short focal end, intermediate focal length, and long focal end according to the third embodiment, respectively. FIGS. 14 to 16 show the aberration curves of the zoom lens 10 at short focal end, intermediate focal length, and long focal end according to the fourth embodiment, respectively. In the drawings broken lines in spherical aberration indicate sine condition, solid lines and broken lines in astigmatism indicate sagittal and meridional, respectively. d indicates d-line, and g indicates g-line. Y' is maximum image height.

In the above drawings the range of values of the abscissa in spherical aberration is ±0.1, the range of values of the abscissa in astigmatism are ±0.1, the range of values of the abscissa in distortion is ±10%, and the range of values of the vertical axis in comatic aberration is ±0.1.

The zoom lenses 10 according to the first to fourth embodiments all achieve a compact size of only 11 lenses, a wide half angle of view of 38 degrees or more, zoom ratio of 8:1 or more, and resolution equivalent to 10 to 15 million pixels of an image sensor.

The high-performance zoom lenses 10 as described above can effectively suppress distortion at about intermediate focal length and at long focal end; however, it cannot at wide angle end or short focal end.

Figure 19A:
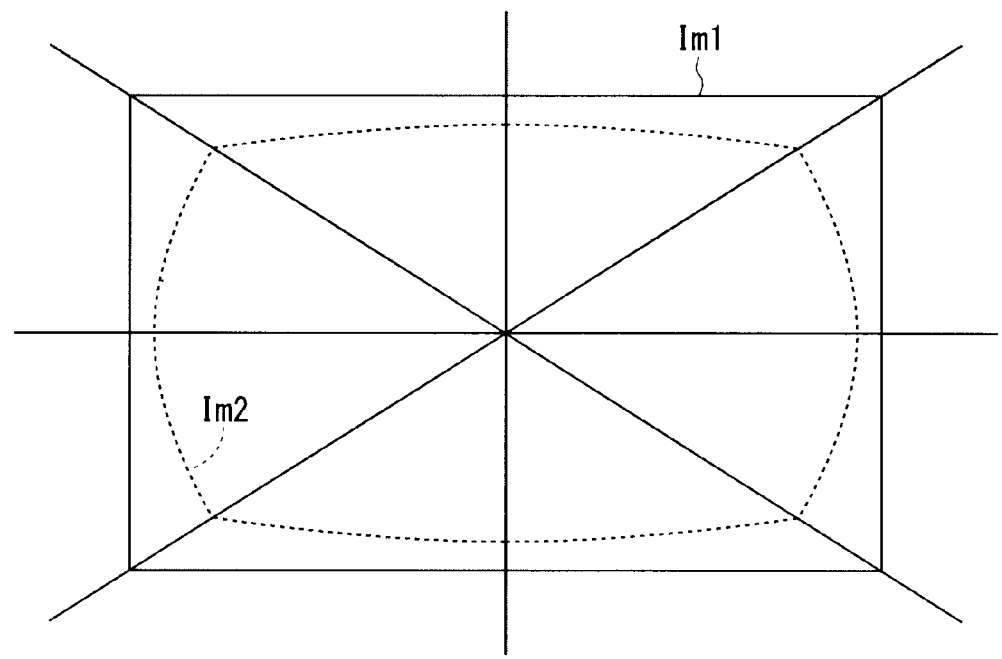
FIGS. 19A, 19B show distortion occurring in the zoom lens according to any one of the first to fourth embodiments.
Figure 19B:
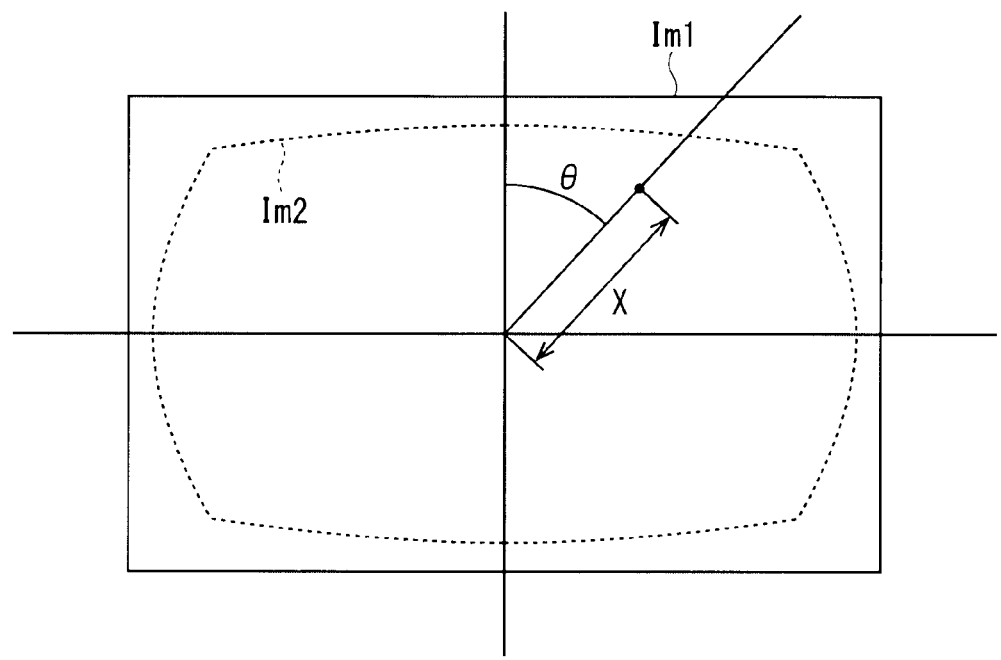

Such distortion is shown in FIGS. 19A, 19B by way of example. In FIG. 19 the shape of the image plane near the long focal end and intermediate focal length is indicated by 1 m1 and it is rectangular almost the same as that of the light receiving face of the image sensor.

The image plane Im2 at the short focal end has a barrel shape indicated by a broken line due to a negative distortion. This negative distortion can be corrected electrically.

The barrel-shape distortion can be corrected in various manners. For example, as shown in FIG. 19B, assume a pixel on a straight line making an angle θ with a vertical reference line and at a distance X from the center of the shape. With distortion Dis(X) (%) at the distance X, the pixel is converted to 100×X/(100+Dis(X)). In this manner, it is possible to effectively correct the distortion at the short focal end and generate good images.

As described above, it is able to realize a novel zoom lens in a small size which can exert excellent optical performance to correct chromatic aberration and to correspond with a light receiving element with 10 to 15 million pixels.

Although the present invention has been described in terms of exemplary embodiments, it is not limited thereto. It should be appreciated that fluctuations may be made in the embodiments described by persons skilled in the art without departing from the scope of the present invention as defined by the following claims.

What is claimed is:

1. A zoom lens comprising:
a first lens group having a positive refractive power, and a second lens group having a negative refractive power, a third lens group having a positive refractive power, and a fourth lens group having a positive refractive power arranged in order from an object side, the third lens group comprised of a first positive lens, a second positive lens, and a negative lens, and a third positive lens in order from the object side; and
an aperture stop disposed between the second lens group and the third lens group, wherein:
when zooming from a short focal end to a long focal end, the zoom lens is moved so that an interval between the first and second lens groups increases, an interval between the second and third lens groups decreases, an interval between the third and fourth lens groups increases, and the first and third lens groups are positioned to be closer to the object side at the long focal end than the short focal end; and
at least two of the first to third positive lenses are made from a material having a partial dispersion ratio $P_{g,F}$ defined by $P_{g,F}=(n_g-n_F)/(n_F-n_C)$ which satisfies the following three conditions:

$1.54<n_d<1.7$ $62<v_d<80$ $0.008<P_{g,F}-(-0.001802*v_d+0.6483)<0.050$ where $n_d$ is a refractive index relative to a d-line, $v_d$ is Abbe number and $n_g$, $n_F$, $n_C$ are refractive indexes relative to a g-line, a F-line, a C-line, respectively.

2. A zoom lens according to claim 1, wherein the third lens group is arranged to have a focal length to satisfy the following condition:

$1.0<f3/fw<2.5$ where f3 is focal length of the third lens group and fw is focal length of the entire zoom lens at the short focal end.

3. A zoom lens according to claim 1, wherein focal lengths of the first and second positive lenses of the third lens group are set to satisfy the following condition:

$0.3<f31/f32<1.2$ where f31 is focal length of the first positive lens and f32 is focal length of the second positive lens.

4. A zoom lens according to claim 1, wherein a focal length of the third positive lens of the third lens group is set to satisfy the following condition:

$0.1<f3/f34<0.6$ where f3 is focal length of the third lens group and f34 is focal length of the positive lens of the third lens group.

5. A zoom lens according to claim 1, wherein the negative lens of the third group is made from a material which satisfies the following two conditions:

$1.80<n\_n_d<2.20$ $25.0<n\_v_d<45.0$ where $n\_n_d$ is refractive index and $n\_v_d$ is Abbe number.

6. A zoom lens according to claim 1, wherein a focal length of the negative lens of the third lens group is set to satisfy the following condition:

$-1.5<f33/fw<-0.5$ where f33 is focal length of the negative lens and fw is focal length of the entire zoom lens at the short focal end.

7. A zoom lens according to claim 1, wherein the third lens group is configured to have a central thickness to satisfy the following condition:

$1.0<D3/fw<2.0$ where D3 is central thickness of the third lens group and fw is focal length of the entire zoom lens at the short focal end.

8. A zoom lens according to claim 1, wherein the first positive lens of the third lens group includes an aspherical surface.

9. A zoom lens according to claim 1, wherein:
the aperture stop is moved so that an interval between the aperture stop and the third lens group is longer at the short focal end than at the long focal end; and
the aperture stop is arranged relative to the third lens group to satisfy the following condition:

$0.05<DSw/ft<0.20$ where DSw is axial interval at the short focal end between the aperture stop and a lens surface closest to an object among the third lens group and ft is focal length of the entire zoom lens at the long focal end.

10. A zoom lens according to claim 1, wherein the zoom lens is formed to satisfy the following condition:

$0.8<Tlt/ft<1.2$ where Tlt is total length of the zoom lens and ft is focal length of the entire zoom lens.

11. A camera device comprising the zoom lens according to claim 1 as an optical system.

12. A hand-held data terminal device comprising the zoom lens according to claim 1 as an optical system of a camera function.

* * * * *